US008330037B2

(12) United States Patent
Furukawa

(10) Patent No.: US 8,330,037 B2
(45) Date of Patent: Dec. 11, 2012

(54) PHOTOVOLTAIC MODULE

(75) Inventor: Isao Furukawa, Kawachinagano (JP)

(73) Assignee: Sanyo Electric, Co., Ltd., Osaka (JP)

( * ) Notice: Subject to any disclaimer, the term of this patent is extended or adjusted under 35 U.S.C. 154(b) by 370 days.

(21) Appl. No.: 12/709,958

(22) Filed: Feb. 22, 2010

(65) Prior Publication Data

US 2010/0212723 A1 Aug. 26, 2010

(30) Foreign Application Priority Data

Feb. 23, 2009 (JP) ................................. 2009-39536

(51) Int. Cl.
| | |
|---|---|
| B25G 3/00 | (2006.01) |
| H02N 6/00 | (2006.01) |
| B05C 17/04 | (2006.01) |
| A47G 5/00 | (2006.01) |
| H01L 31/00 | (2006.01) |

(52) U.S. Cl. .................. 136/251; 136/244; 101/127.1; 160/381; 403/231

(58) Field of Classification Search .......... 136/243–259; 101/127.1, 128, 129; 160/381; 403/408.1
See application file for complete search history.

(56) References Cited

U.S. PATENT DOCUMENTS

| | | | | |
|---|---|---|---|---|
| 4,452,138 A | * | 6/1984 | Bubley et al. ............. | 101/127.1 |
| 2008/0302356 A1 | * | 12/2008 | Shin et al. .................. | 126/704 |
| 2009/0025314 A1 | * | 1/2009 | Komamine et al. .......... | 52/173.3 |
| 2010/0243034 A1 | * | 9/2010 | Hu et al. ...................... | 136/251 |
| 2010/0294340 A1 | * | 11/2010 | Cunningham et al. ....... | 136/251 |

FOREIGN PATENT DOCUMENTS

| | | |
|---|---|---|
| DE | 3611542 A1 * | 10/1987 |
| JP | 2007-95819 A | 4/2007 |

OTHER PUBLICATIONS

Z. Li, S. C. Mantell, and J. H. Davidson, "Mechanical analysis of streamlined tubes with non-uniform wall thickness for heat exchangers", Journal of Strain Analysis for Engineering Design 40, p. 275 (2005).*

* cited by examiner

Primary Examiner — Jeffrey T Barton
Assistant Examiner — Eric R Smith
(74) Attorney, Agent, or Firm — Ditthavong Mori & Steiner, P.C.

(57) ABSTRACT

A photovoltaic module includes a photovoltaic module body and frames mounted to a periphery thereof. The frame includes a main body having a hollow structure and a fit-engagement portion located above the main body and fittingly receiving the periphery of the photovoltaic module body. The main body of the frame is formed with a mounting portion into which a press-insertion member is press-inserted and which has a great outside wall thickness and a small inside wall thickness in section. The frames are fixed to each other by press-inserting the press-insertion member into the mounting portions thereof.

7 Claims, 9 Drawing Sheets

PHOTOVOLTAIC MODULE

The priority application Number JP2009-39536 upon which this patent application is based is hereby incorporated by reference.

BACKGROUND OF THE INVENTION

1. Field of the Invention

The present invention relates to a photovoltaic module wherein frames are mounted to a periphery of a photovoltaic module body including a plurality of solar cells.

2. Description of the Prior Art

Solar cells are expected to serve as a novel energy source because they can convert light energy from the sun directly into electric energy, the sun providing an inexhaustible supply of clean energy.

Each solar cell provides a small output of several watts. Therefore, a common practice to use such solar cells as a source of electric power for household use or for use in building or the like is to connect a plurality of solar cells in series or in parallel thereby forming a photovoltaic module the output of which is increased to hundreds of watts. Such a photovoltaic module is disclosed in JP2007-95819(A), for example.

FIG. 10 is a plan view showing a conventional photovoltaic module. The conventional photovoltaic module is described with reference to FIG. 10.

As shown in FIG. 10, a plurality of solar cells 800 are electrically interconnected by means of a wiring material 802 made of a conductive material such as copper foil and are sealed between a surface member having translucency, such as glass or translucent plastic, and a backside member made of weather-resistant film with a sealing material having translucency, such as EVA (Ethylene Vinyl Acetate) having excellent weather resistance and moisture resistance.

The plural solar cells 800 are connected in series by means of the wiring material 802 so as to constitute a string 810 as a unit. These strings 810, 810 are interconnected by means of an interconnecting wiring or a so-called crossover wiring 811. Further, the strings are connected with a leading line (not shown) for extracting the output from these solar cells 800.

A photovoltaic module body 820 is formed in this manner. A frame 850 formed of an aluminum material or the like is mounted to a periphery of the photovoltaic module body.

The strength of such a photovoltaic module is assured not only by the surface member but also by the frames 850. This negates the need for increasing the thickness of the surface member in a case where the photovoltaic module is increased in size. Therefore, the weight increase of the photovoltaic module can be lessened so that the photovoltaic module becomes easier to handle. Another advantage is that the amount of transmitted light is increased by virtue of the decreased thickness of the surface member so that power generation efficiency can be increased.

By the way, as shown in FIG. 11, the above-described frames 850 are coupled and fixed to each other by press-inserting a securing member called corner piece 830 into respective mounting portions 851 thereof located at a corner defined by the frames 850.

In consideration of the increase in the weight and cost of the photovoltaic module, the thickness of the frame 850 is reduced as much as possible. A conventional frame 850 commonly used has a thickness of 1.5 mm, for example.

In some cases, the corner piece 830 press-inserted into the above-described frames 850 may deform the frames 850 so as to produce a gap 855, as shown in FIG. 12.

When the gap 855 is produced, an adjustment work is required for closing the gap 855, resulting in a drawback of lowered workability.

SUMMARY OF THE INVENTION

It is an object of the invention to provide a photovoltaic module which prevents the deformation of each corner during frame assembly and achieves a good workability.

In accordance with the invention, a photovoltaic module comprises a photovoltaic module body including a plurality of solar cells sealed between a surface member and a backside member with a sealing material; and a frame mounted to a periphery of the photovoltaic module body and is characterized in that the frame includes a main body having a hollow structure and a fit-engagement portion located above the main body and fittingly receiving the periphery of the photovoltaic module body, that the main body is formed with a mounting portion into which a press-insertion member mounted in another frame is press-inserted, that the mounting portion has a great outside wall thickness and a small inside wall thickness in section, and that the frames are fixed to each other by press-inserting the press-insertion member into the mounting portions thereof.

As described above, the invention has the arrangement wherein the frame has the greater outside wall thickness and the smaller inside wall thickness in section such that the inside portion of the frame is deflected by press-inserting the press-insertion portion so as to prevent the deformation of the outside portion of the frame. As a result, the adjustment work for the frame or the like is decreased so that the production efficiency is increased.

The invention may also have an arrangement wherein the outside wall thickness in section is in the range of 1.8 mm to 1.5 mm and the inside wall thickness in section is in the range of 1.1 mm to 1.3 mm.

The invention may also have an arrangement wherein the photovoltaic module includes the four frames each corresponding to each of the four sides of the rectangular photovoltaic module body and wherein on a corner defined by a respective pair of intersecting sides of the photovoltaic module body, a respective pair of frames are fixed to each other by press-inserting the press-insertion member into the mounting portions thereof.

The invention may also have an arrangement wherein the fit-engagement portion has a U-shape in section and the frame with the press-insertion member press-inserted in the mounting portion thereof is deflected and deformed inward at its inside portion while a lower side of the fit-engagement portion having the U-shaped section is deformedly deflected upward.

The inside portion of the frame is also deflected toward the photovoltaic module body by the press-insertion as described above whereby a fixing relation between the photovoltaic module body and the frame is also enhanced.

The invention may also have an arrangement wherein the frames in abutting contact have arc-shaped ends such that a corner defined by the frames in abutting contact is chamfered.

The chamfered corner is formed as described above such that a person touching the corner with his/her hands or the like may not have pain or painful sensation such as caused upon contact against a sharply-angled article. Hence, the module may be handled more easily.

Figure 1:
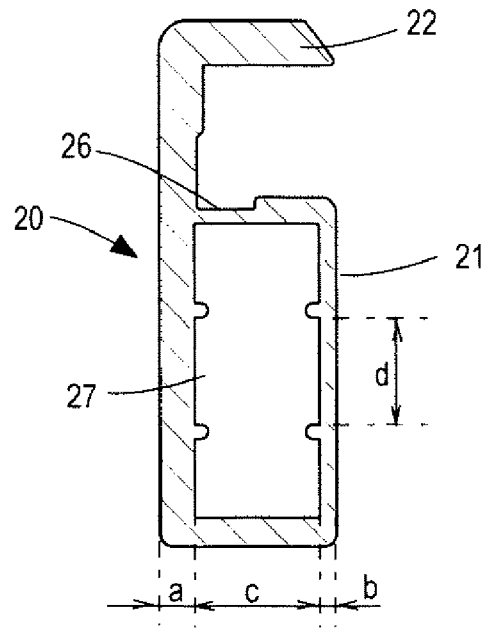
FIG. 1 is a sectional view showing a frame for use in a photovoltaic module according to a first embodiment of the invention.

The foregoing and other objects, features, aspects and advantages of the present invention will become more apparent from the following detailed description of the present invention when reviewed in conjunction with the accompanying drawings.

DETAILED DESCRIPTION OF THE PREFERRED EMBODIMENTS

Embodiments of the invention will be described in detail with reference to the accompanying drawings. In order to avoid repetition, the same reference numbers will be used in the drawings to identify similar or equivalent components and the description thereof is dispensed with.

Figure 5:
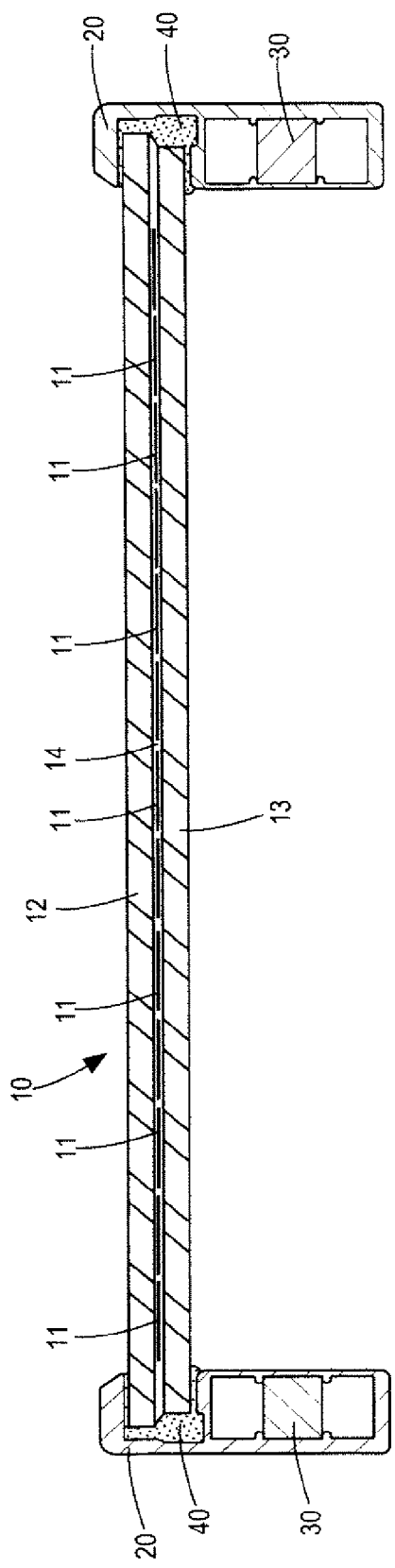
FIG. 5 is a schematic sectional view showing the photovoltaic module according to the first embodiment of the invention.

FIG. 5 is a schematic sectional view showing a photovoltaic module according to a first embodiment of the invention. Referring to this figure, description is made on a general structure of this photovoltaic module.

The photovoltaic module of the invention includes a plurality of solar cells 11. The solar cell 11 comprises, for example, a crystalline semiconductor composed of monocrystalline silicon or polycrystalline silicon having a thickness on the order of 0.15 mm and is generally shaped like a square 100 mm on a side. However, the invention is not limited to this and may employ other solar cells.

Within the solar cell 11, an n-type region and a p-type region are formed, for example, while an interfacial area between the n-type region and the p-type region defines a junction for forming an electric field for carrier separation. An employed solar cell, for example, includes an intrinsic amorphous silicon layer interposed between a monocrystalline silicon substrate and an amorphous silicon substrate for reducing defects in interfaces therebetween. Thus, the solar cell is improved in heterojunction interface characteristic.

A respective one of the plural solar cells 11 is electrically connected to its adjoining solar cell(s) 11 by means of a wiring material (not shown) made of flat copper foil or the like. Specifically, one end of the wiring material is connected to a collector electrode on an upper side of a certain solar cell 11, while the other end thereof is connected to a collector electrode on a lower side of another solar cell 11 adjoining the certain solar cell 11. An arrangement is made wherein these solar cells 11 are connected in series by means of the wiring material so as to provide a predetermined output of 200 W, for example, from a photovoltaic module body 10.

As shown in FIG. 5, the photovoltaic module body 10 is constructed such that the plural solar cells 11 are electrically interconnected by means of the wiring material made of a conductive material such as copper foil (not shown) and are sealed between a surface member 12 having translucency, such as glass or translucent plastic, and a backside member 13 comprising a translucent member such as weather-resistant film, glass or translucent plastic with a translucent sealing material 14 such as EVA (Ethylene Vinyl Acetate) having excellent weather resistance and moisture resistance.

The above-described photovoltaic module body 10 is fitted in frames 20 made of aluminum or the like by applying a seal material 40 made of a silicone resin or the like to a periphery thereof. The frame 20 is formed of aluminum, stainless steel, roll forming steel sheet or the like. As needed, a terminal box (not shown) is attached to a surface of the backside member 13, for example.

Figure 2:
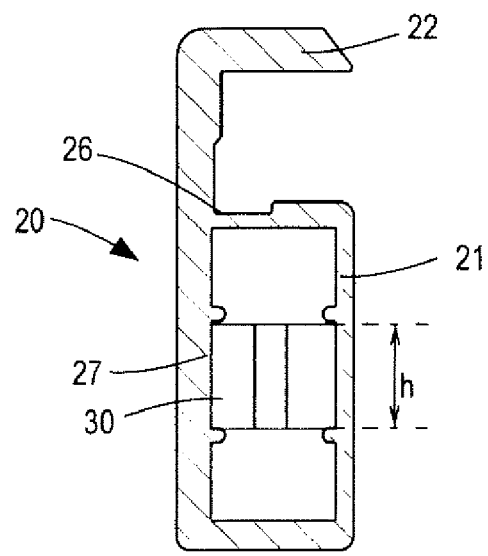
FIG. 2 is a sectional view showing a corner piece mounted in the frame for use in the photovoltaic module according to the first embodiment of the invention.
Figure 4:
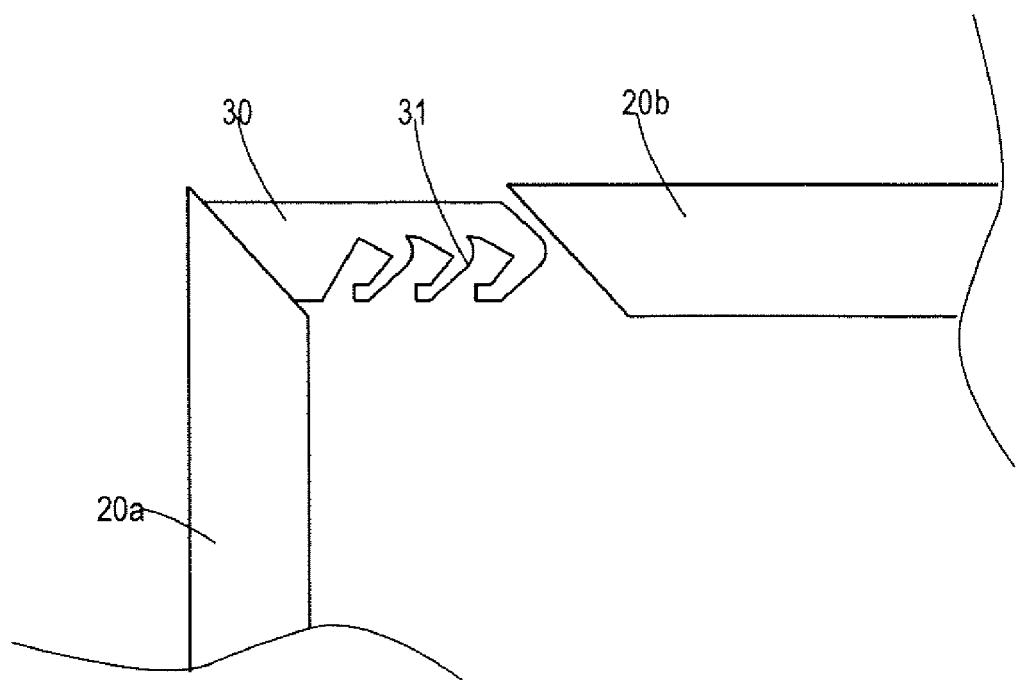
FIG. 4 is a plan view showing how the frames for use in the photovoltaic module according to the first embodiment of the invention are fixed.
Figure 10:
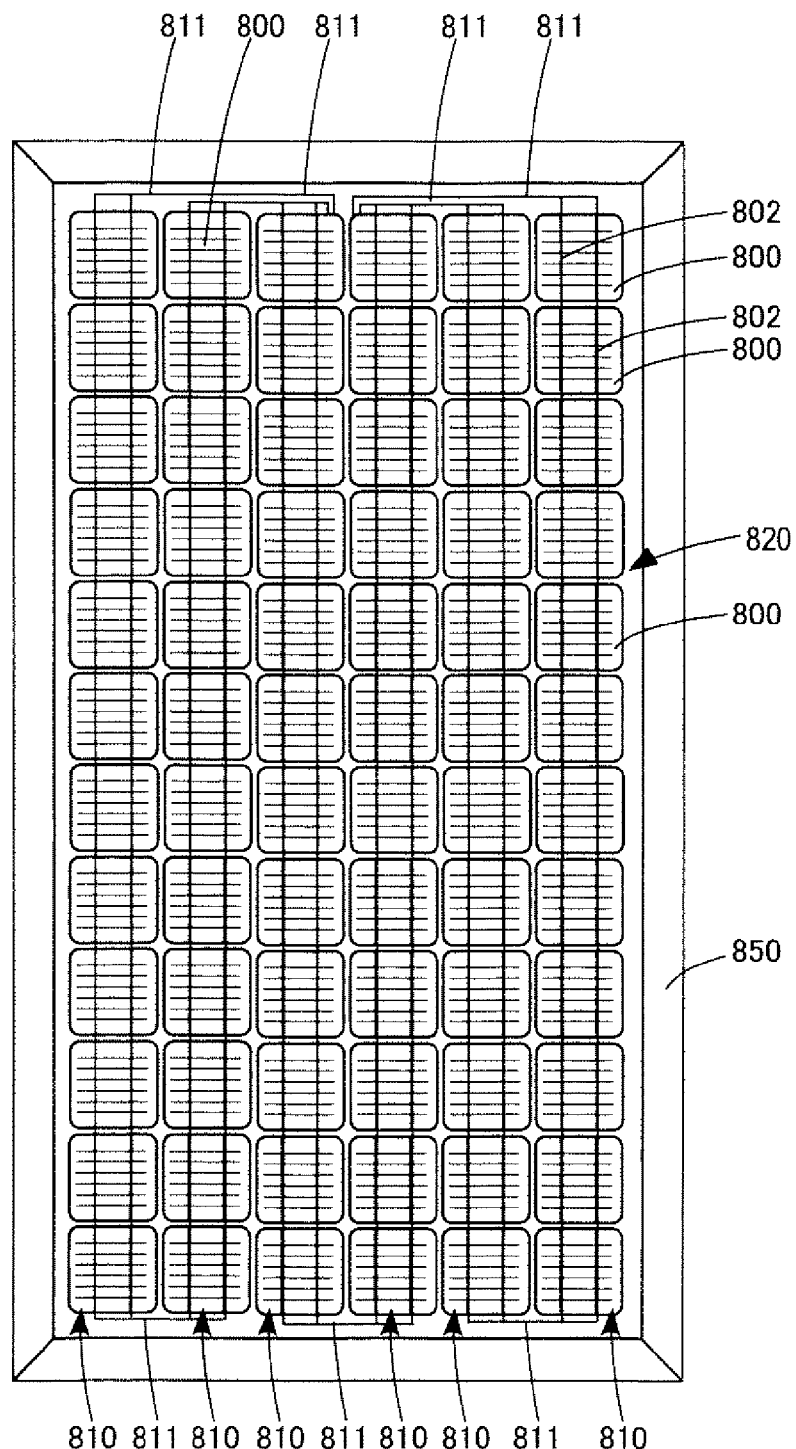
FIG. 10 is a plan view showing a conventional photovoltaic module.
Figure 11:
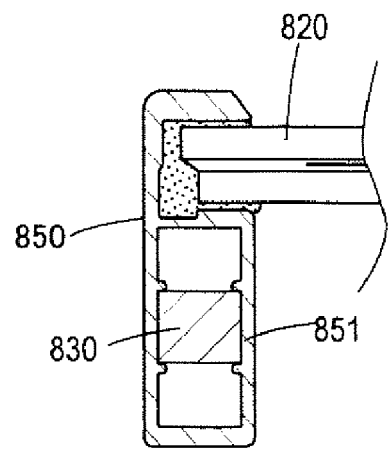
FIG. 11 is a schematic sectional view showing the conventional photovoltaic module.
Figure 12:
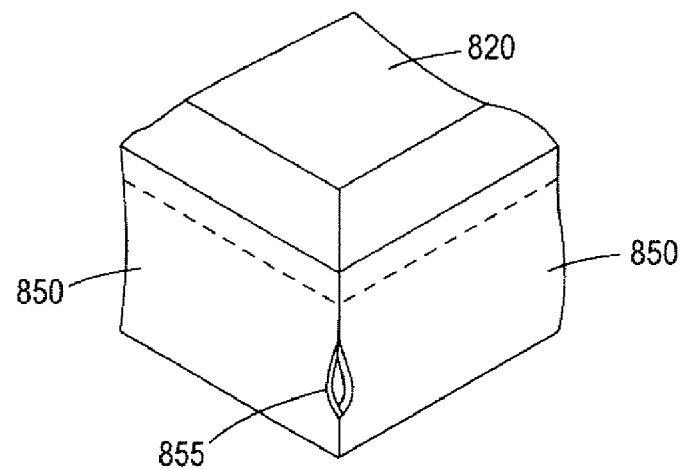
FIG. 12 is a perspective view showing the conventional photovoltaic module.

As shown in FIG. 1 and FIG. 2, an exemplary frame 20 includes a main body 21 having a hollow structure, and a fit-engagement portion 22 located above the main body 21 and having a U-shape in section for fittingly receiving an outer periphery of the photovoltaic module body by intermediary of the seal material. The fit-engagement portion 22 is formed with a recess 26 for holding the seal material. As shown in FIG. 10, four frames 20 are provided in correspondence to the four sides of the rectangular photovoltaic module body 10, respectively. The frames 20a, 20b are coupled and fixed to each other on a corner defined by a respective pair of intersecting sides of the photovoltaic module body. In this embodiment, as shown in FIG. 4, the frames 20 are coupled so as to be normal to each other on the corner. Accordingly, the frames 20a, 20b have their ends cut at 45 degrees.

A corner portion of the frame 20 is formed with a rectangular mounting portion 27 into which a corner piece to be described hereinlater is press-inserted.

As seen in section, the mounting portion 27 according to the embodiment has a great outside wall thickness and a small inside wall thickness. Specifically, the mounting portion 27 is constructed such that an outside wall thickness (a) in section is in the range of 1.8 mm to 1.5 mm and an inside wall thickness (b) in section is in the range of 1.1 mm to 1.3 mm. According to the embodiment, the mounting portion is constructed such that the total of the outside wall thickness and the inside wall thickness in section is 2.9 mm.

In this embodiment, the frame 20 is formed of an aluminum material and the rectangular mounting portion 27 has a width (c) of about 8.8 mm and a height (d) of about 20 mm.

The mounting portion 27 is constructed such that if the outside wall thickness (a) in section is 1.6 mm, the inside wall thickness (b) in section is 1.3 mm.

In a conventional frame, the mounting portion 27 is constructed such that the outside wall thickness and the inside wall thickness in section are the same. Either wall thickness is 1.45 mm so that the total of these wall thicknesses is 2.9 mm.

As described above, this embodiment has the same total wall thickness as that of the conventional frame so that there is no difference in strength, weight or cost between the conventional frame and the frame of the embodiment.

Figure 3:
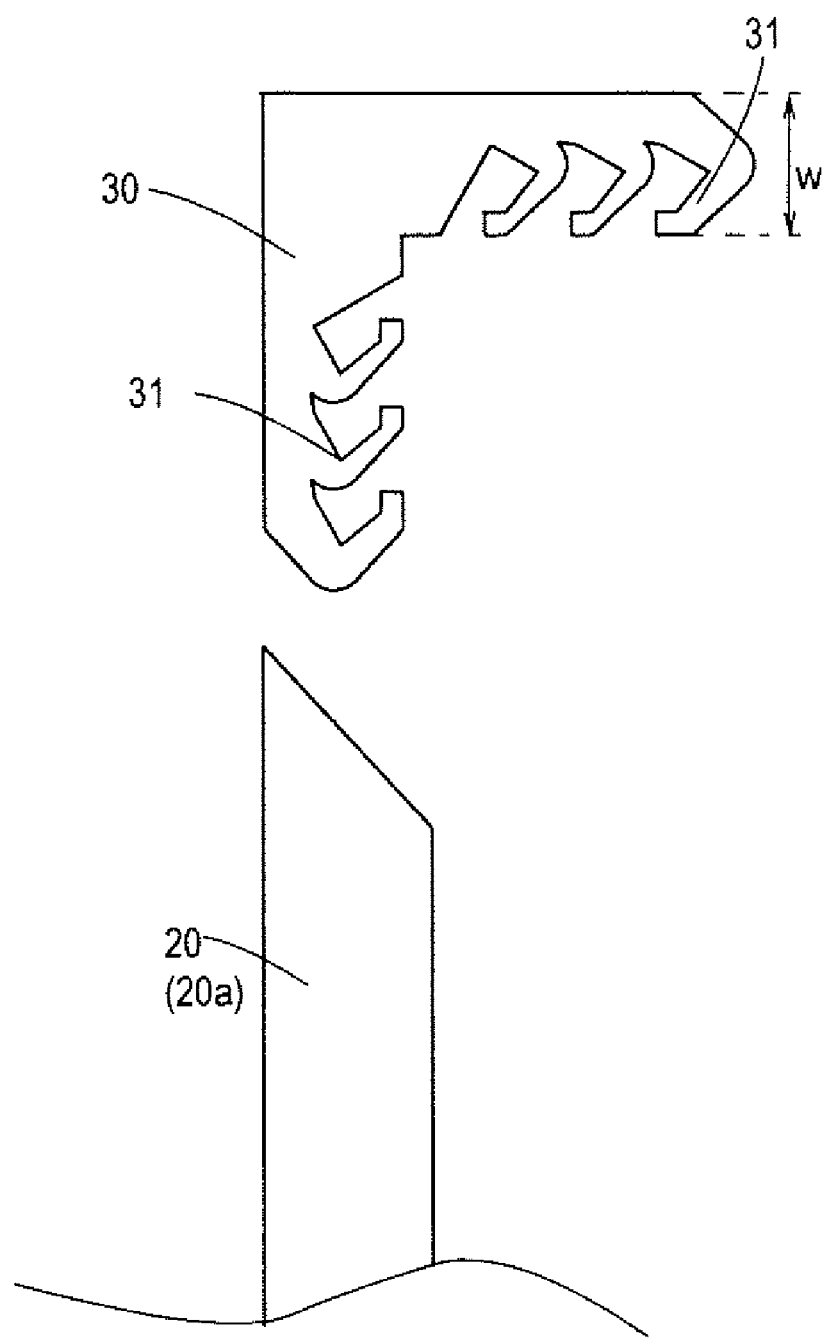
FIG. 3 is a plan view showing the frame and corner piece for use in the photovoltaic module according to the first embodiment of the invention.

As shown in FIG. 3 and FIG. 4, a corner piece 30 press-inserted in the mounting portion 27 is formed of aluminum and is formed with a hook-like portion 31. The hook-like portion 31 of this embodiment has a width (w) of 8.95 mm, which is slightly greater than the width (c) of the rectangular mounting portion 27. The hook-like portion of this embodiment has a height (h) of 19 mm, which is equal to or slightly smaller than the height (b) of the mounting portion 27.

The frames 20 (20a, 20b) are interconnected as follows. As shown in FIG. 2 and FIG. 4, a hook-like portion 31 of the corner piece 30 is press-inserted in the mounting portion 27 of one frame 20 (20a) thereby fixing the corner piece 30 therein. Subsequently, the other hook-like portion 31 of the corner piece 30 is press-inserted in the mounting portion 27 of the other frame 20 (20b) whereby the frames 20a, 20b are fixed to each other.

Figure 7:
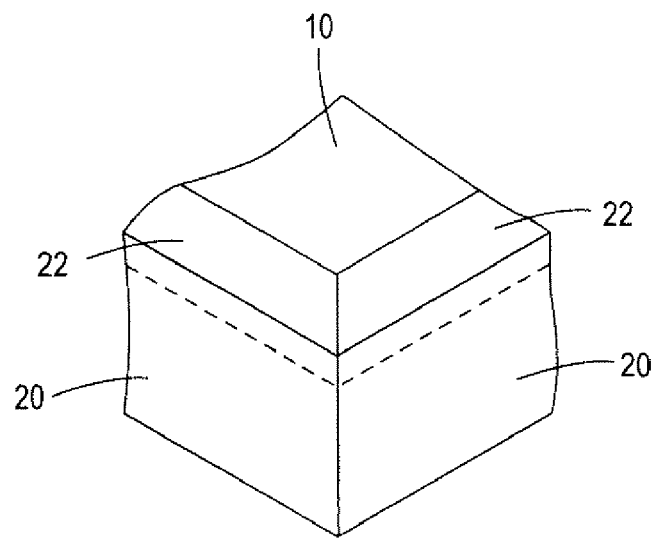
FIG. 7 is a perspective view showing the frames fixed to each other according to the first embodiment of the invention.

As seen in section, the mounting portion 27 has the greater outside wall thickness and the smaller inside wall thickness. Therefore, the mounting portion 27 is significantly deflected at the inside wall but the outside wall thereof undergoes little deflection. As shown in FIG. 7, therefore, there occurs no gap between outer sides of joint surfaces of the frames 20, 20, which gap may result from the deformation or the like of the frames. Thus is eliminated the need for an adjustment work.

Figure 6:
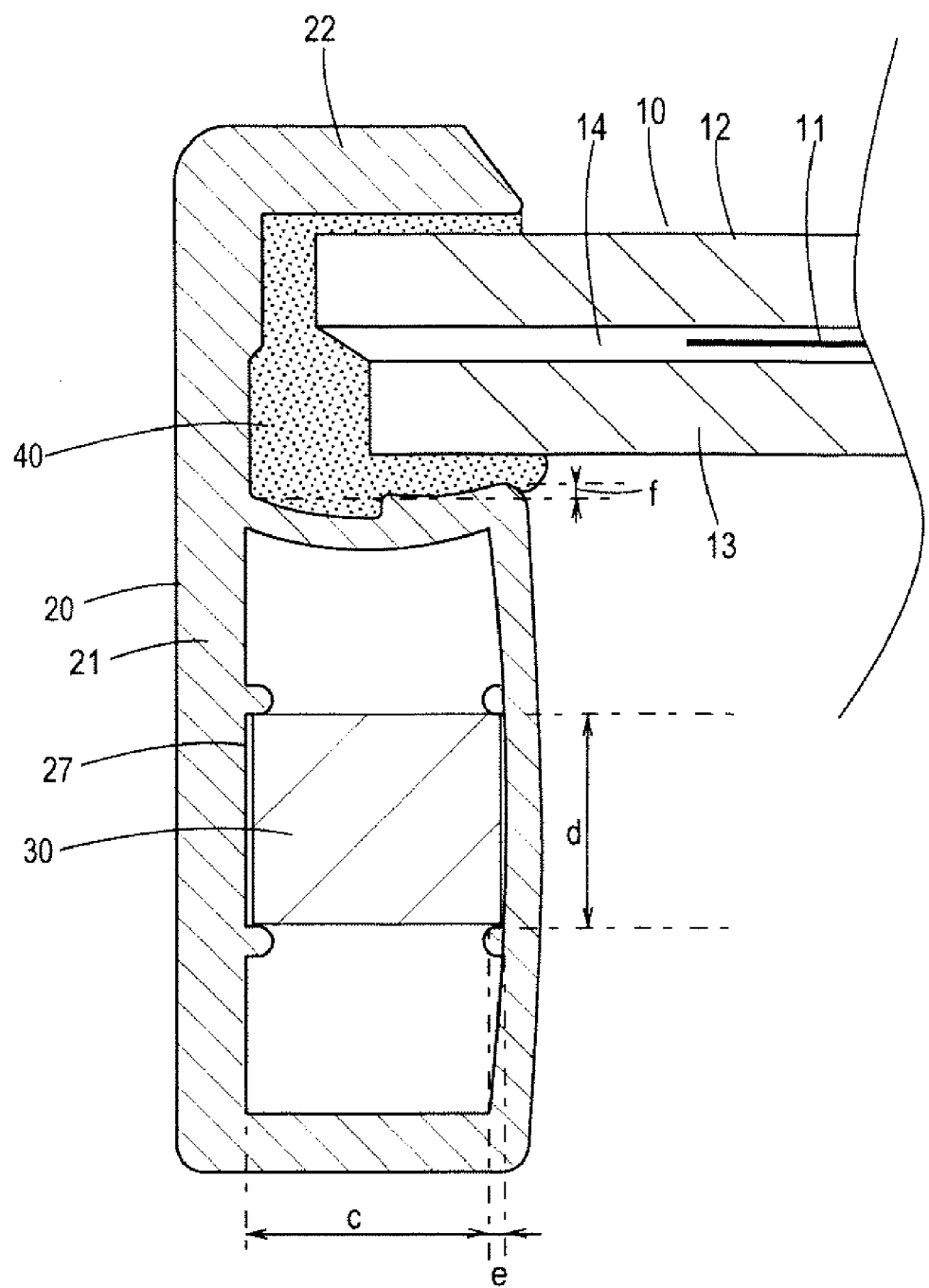
FIG. 6 is a schematic sectional view showing the essential part of the photovoltaic module according to the first embodiment of the invention.

As shown in FIG. 6, the inside wall of the mounting portion 27 is deflected and deformed inward by an amount represented by 'e' in the figure. In this embodiment, the deformation amount 'e' was 0.15 mm. The inward deflection of the inside wall causes a lower side of the fit-engagement portion 22 having the U-shaped section to be deformedly deflected upward by an amount represented by 'f' in the figure. In this embodiment, the deformation amount 'f' was 0.05 mm.

Thus, the portion of the frame 20 that is in contact with the photovoltaic module body 10 is also raised so that fixing relation between the photovoltaic module body 10 and the frame 20 is also enhanced.

Figure 8:
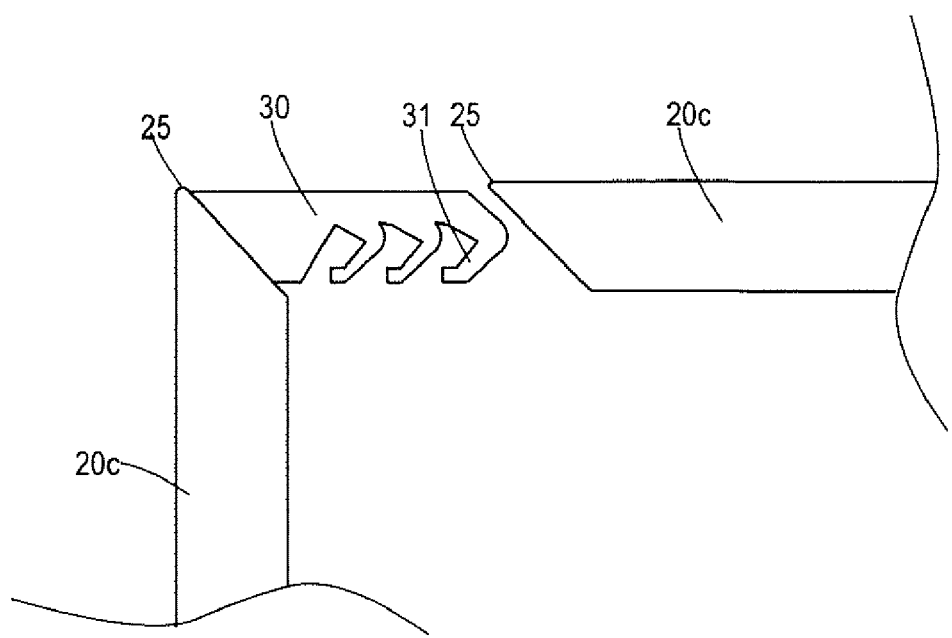
FIG. 8 is a plan view showing how frames for use in a photovoltaic module according to a second embodiment of the invention are fixed.
Figure 9:
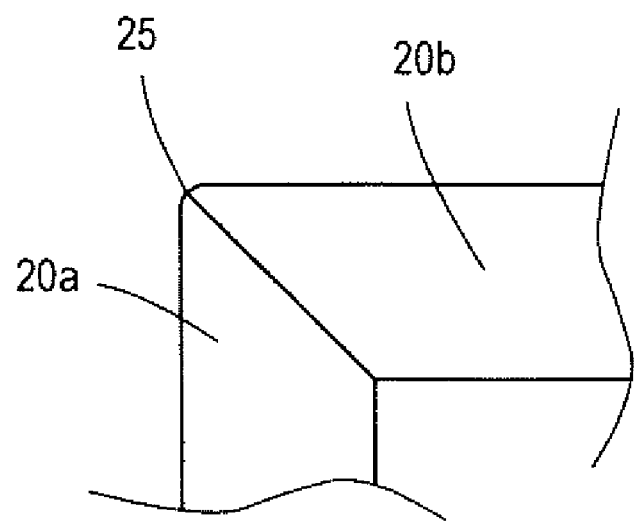
FIG. 9 is a plan view showing the frames for use in the photovoltaic module according to the second embodiment of the invention.

FIG. 8 and FIG. 9 are plan views showing a second embodiment of the invention.

The second embodiment is arranged such that joint surfaces on which frames 20c, 20c abut on each other define a chamfered corner. For this purpose, the frames 20c, 20c in abutting contact include arc-shaped ends 25. Just as in the above embodiment, the frame 20c has a great outside wall thickness and a small inside wall thickness in section.

According to the frame 20c of the invention, the press-insertion of the corner piece 30 does not cause the deformation of an outside portion of the frame. Therefore, the corner formed by the frames 20c, 20c in abutting contact has a chamfered configuration because the frames 20c in abutting contact have their ends shaped like an arc.

In this manner, the chamfered corner is formed so that a person touching the corner with his/her hand or the like may not have pain or painful sensation such as caused upon contact against a sharply-angled article. Hence, the module may be handled more easily.

It should be understood that the embodiments disclosed herein are to be taken as examples in every point and are not limited. The scope of the present invention is defined not by the above described embodiments but by the appended claims. All changes that fall within means and bounds of the claims, or equivalence of such means and bounds are intended to be embraced by the claims.

The invention claimed is:

1. A photovoltaic module comprising:
a photovoltaic module body including a plurality of solar cells sealed between a surface member and a backside member with a sealing material;
a plurality of frames mounted to a periphery of the photovoltaic module body; and
a press-insertion member connecting each of the frames, wherein
the frames including a main body having a hollow structure along a direction on which the frames extend and a fit-engagement portion fittingly receiving the periphery of the photovoltaic module body,
the main body being formed in a roughly rectangular shape in section perpendicular to the direction on which the frames extend,
the roughly rectangular main body including a first side and a second side, the first side facing at a side of the photovoltaic module body, the second side being opposite the first side,
each of the frames being mutually connected by inserting the press-insertion member into the main body,
a thickness of the region in the first side where the press-insertion member is inserted is thinner than that in the second side where the press insertion member is inserted; and
the first side being deflected toward the photovoltaic module body with an insertion of the press-insertion member.

2. The photovoltaic module according to claim 1, wherein the thickness in section of the region in the second side where the press-insertion member is inserted is in the range of 1.8 mm to 1.5 mm and the thickness in section of the region in the first side where the press-insertion member is inserted is in the range of 1.1 mm to 1.3 mm.

3. The photovoltaic module according to claim 1, including the four frames each corresponding to each of the four sides of the rectangular photovoltaic module body, wherein on a corner defined by a respective pair of intersecting sides of the photovoltaic module body, a respective pair of frames are fixed to each other by press-inserting the press-insertion member into the main body.

4. The photovoltaic module according to claim 3, wherein the frames in abutting contact have arc-shaped ends such that a corner defined by the frames in abutting contact is chamfered.

5. The photovoltaic module according to claim 1, wherein the fit-engagement portion has a U-shaped opening facing the photovoltaic module body, the main body including a third side, the third side constituting a part of the fit-engagement portion, at least a part of the third side being deformed in a manner to project toward the fit-engagement portion with the insertion of the press-insertion member.

6. The photovoltaic module according to claim 5, wherein an end portion of the third side in the main body is deformed in a manner to project toward the fit-engagement portion.

7. The photovoltaic module according to claim 1, wherein a width of the press-insertion member between a face contacting with the first side of the main body and a face contacting with the second side of the main body is wider than a width of the main body between an inside wall of the first side and an inside wall of second side on a region where the press-insertion member is to be inserted under the state that the press-insertion member is not inserted.

* * * * *